July 5, 1966
A. C. CANTU
3,259,361
OCEAN WAVE ENERGY GENERATOR
Filed Nov. 6, 1964
3 Sheets-Sheet 2
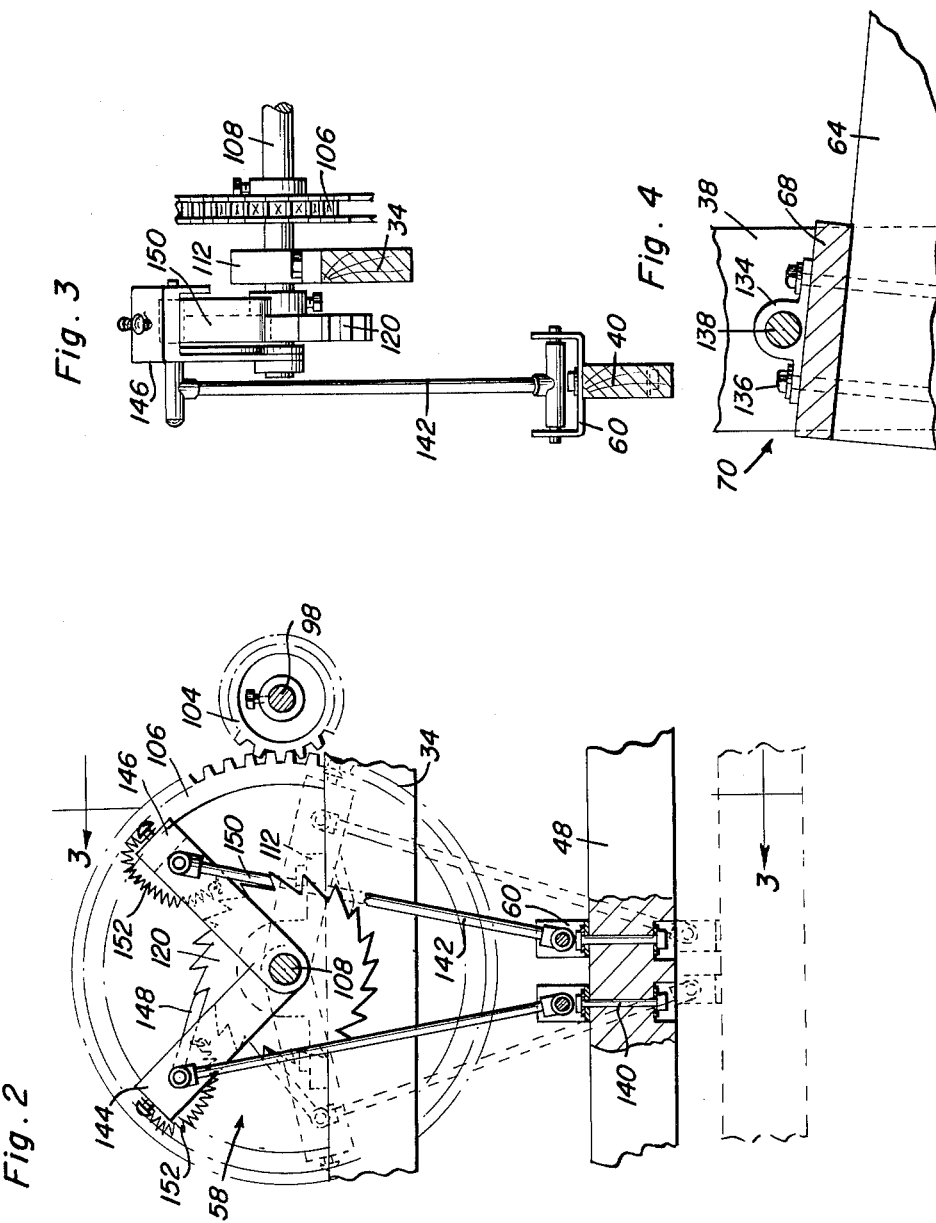
Antonio Cesar Cantu
INVENTOR.

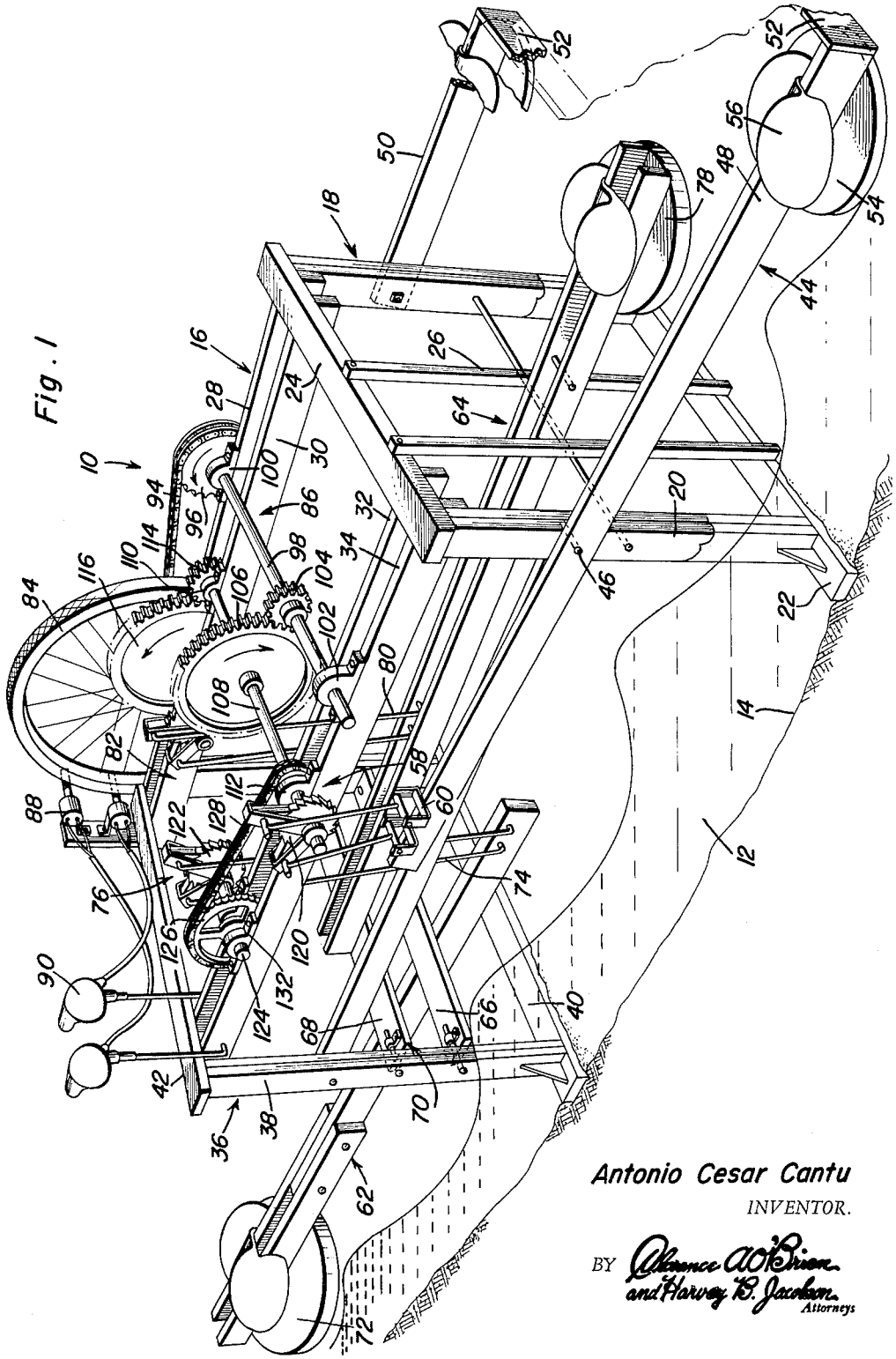

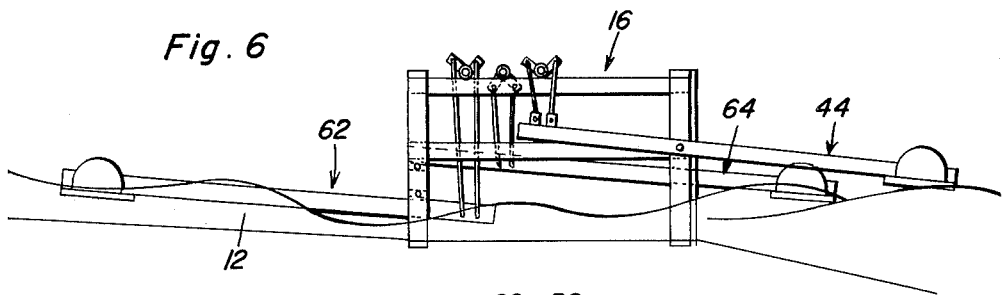
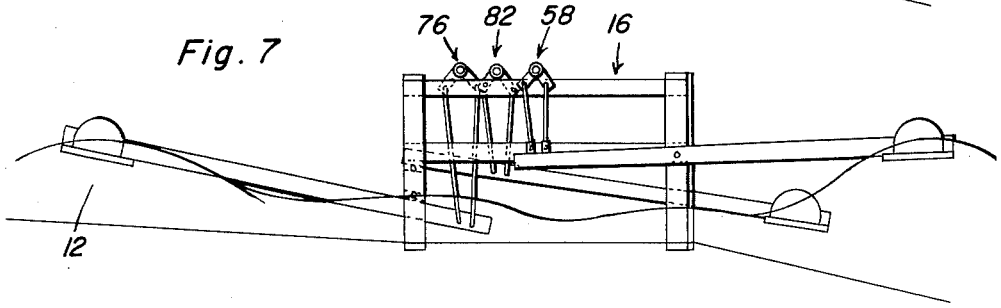
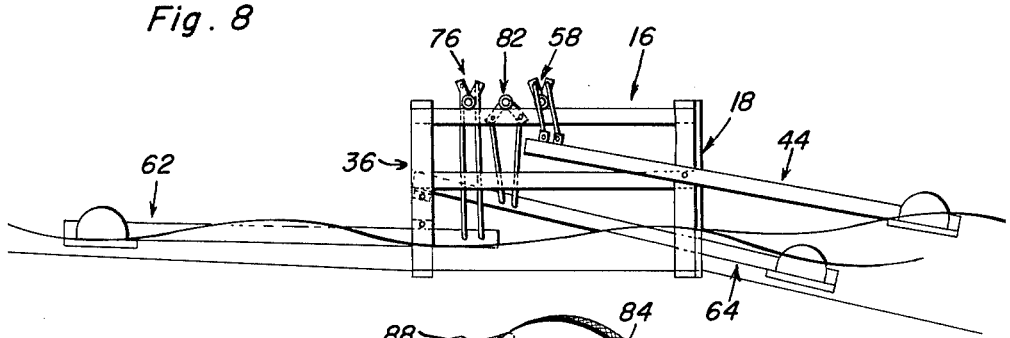
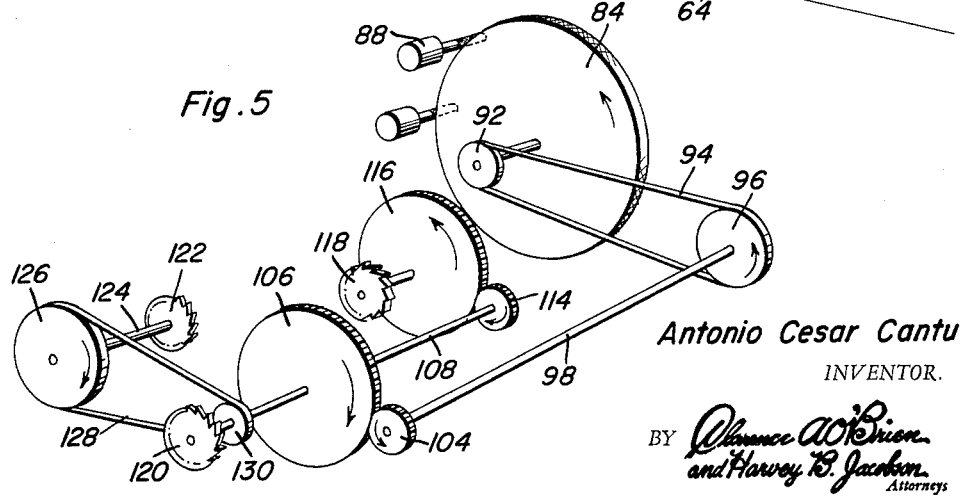

United States Patent Office 3,259,361
Patented July 5, 1966

3,259,361
OCEAN WAVE ENERGY GENERATOR
Antonio Cesar Cantu, Diego de Montemayor 219 sur,
Monterrey, Neuvo Leon, Mexico
Filed Nov. 6, 1964, Ser. No. 409,526
3 Claims. (Cl. 253—11)

This invention relates to a device for converting the kinetic energy of water in motion into a useful form.

A primary object of the present invention is to provide a device capable of efficiently converting energy available in the wave motion of ocean water into a form readily available for many different purposes including electrical power. The kinetic energy of ocean water has long been known as a source of unlimited power. The many attempts to harness this source of power have not proved to be practicable. The device of the present invention however, will enable this unlimited source of power to be utilized more widely because of a significantly efficient conversion of energy with relatively inexpensive equipment.

It is therefore another object of the present invention to provide a device which will more efficiently convert the kinetic energy involved in the wave motion of water into useful rotation of a power output wheel.

An additional object of the present invention in accordance with the foregoing objects, is to provide a wave motion generator having a plurality of pivoted float assemblies so arranged as to be successively oscillated by a single wave in order to extract the maximum amount of energy therefrom.

A still further object of the present invention is to provide a wave energy generator having a plurality of one-way ratchet drive devices arranged to transmit motion in both directions of movement of the float assembly to which the ratchet drives are connected. Energy is thereby extracted during both the rise and fall of the waves in order to produce a continuous output.

These together with other objects and advantages which will become subsequently apparent reside in the details of construction and operation as more fully hereinafter described and claimed, reference being had to the accompanying drawings forming a part hereof, wherein like materials refer to like parts throughout, and in which:

FIGURE 1 is a perspective view of the wave generator device of the present invention.

FIGURE 2 is an enlarged partial side elevational view of one of the one-way ratchet drives forming part of the generator.

FIGURE 3 is a sectional view taken substantially through a plane indicated by section line 3—3 in FIGURE 2.

FIGURE 4 is an enlarged partial sectional view of one of the fulcrum assemblies associated with the generator.

FIGURE 5 is a simplified perspective view of the drive train forming part of the wave generator of the present invention.

FIGURES 6, 7 and 8 are simplified diagrammatic views of the wave generator in different operational phases.

Referring now to the drawings in detail and initially to FIGURE 1, it will be noted that the wave generator is generally denoted by reference numeral 10 and is shown in use partially submerged in its fluid medium or water 12 in order to extract energy manifested in the wave motion of the water surface. The generator is mounted on a solid floor 14 adjacent the shore for example so that the frame assembly thereof, generally referred to by reference numeral 16, will extend above the surface of the water. The frame assembly includes a pair of interconnected end subframes which rest or are supported on the floor 14 in fixed position. The end subframe 18 includes a pair of vertical posts 20 which extend upwardly from a base member 22 to which they are connected, the posts 20 being interconnected at the upper ends by a cross-beam 24. A pair of intermediate vertical frame members 26 interconnect the beam 24 with the base 22 in order to form a rigid end subframe to which two pairs of connecting beams 28, 30, 32 and 34 are secured. The connecting beams are secured at the opposite ends to the other end subframe 36 which also includes a pair of vertical posts 38 interconnected between a base 40 and a top cross-beam 42.

The end subframe 18 pivotally mounts on the vertical posts 20 thereof, a float assembly generally referred to by the reference numeral 44. The posts 20 therefore mount pivot bolt assemblies 46 for respectively mounting lever members 48 and 50 interconnected at the ends remote from the frame assembly by a connecting member 52 so as to oscillate in unison. Secured to each of the levers, are float elements 54 while ballast members 56 are supported thereabove. The float assembly 44 is thereby so weighted in relation to the buoyant force of the water imposed on the float element 54 as to properly rise and fall with the wave motion of the water surface. One of the lever members 48 extends beyond the fulcrum point, established by the bolt assembly 46 to a point intermediate the end subframe assemblies 18 and 36 so as to be interconnected with a one-way ratchet drive assembly 58 by means of a pair of pivot brackets 60. The frame assembly also pivotally supports float assemblies 62 and 64 both of which latter float assemblies are supported by the end subframe assembly 36. Accordingly, a pair of vertically spaced fulcrum members 66 and 68 are pivotally mounted between the posts 38 by pivot assemblies 70. The float assembly 62 is secured intermediate the opposite longitudinal ends thereof to the fulcrum member 66. A float element 72 is secured to the float assembly 62 adjacent an end remote from the frame assembly while the opposite end of the float assembly 62 is pivotally connected to a pair of connecting rods 74 by means of which the oscillatory movement imparted to the float assembly is transmitted to a one-way ratchet drive assembly 76. The float assembly 64 also is provided with a float element 78 at an end thereof which extends from the end subframe assembly 18 in longitudinally spaced relation to the float elements 54 associated with the float assembly 44. The end of the float assembly 64 opposite the float element 78 is secured to the fulcrum member 68 while the float assembly is operatively connected by a pair of connecting rods 80 to a one-way ratchet drive assembly 82. It will therefore be apparent, that while the float assembly 62 is operatively connected to its associated ratchet drive assembly 76 on a side of its associated fulcrum member 66 opposite the float element 72, the float assembly 64 is connected to its associated ratchet drive assembly 82 from the same side of its fulcrum member 68 as the float element 78. Accordingly, the arrangement of float assemblies is such that a single wave will cause successive oscillation of the float assemblies with motion being transmitted in a continuous fashion to a power output wheel 84. Therefore, the three ratchet drive assemblies 58, 76 and 82 are drivingly interconnected with the power output wheel 84 by a gear train assembly generally referred to by reference numeral 86. The power output wheel is adapted to be in driving engagement with the input shafts of a pair of electric generators 88 mounted by the frame assembly. These generators may furnish electrical energy for any desired purpose and may also be wired to lamp assemblies 90 for illumination purposes.

With continued reference to FIGURE 1 and to FIGURE 5, it will be observed that the power output wheel 84 is provided with a sprocket gear 92 about which a sprocket chain 94 is entrained so that motion may be imparted to the power output wheel from the sprocket gear 96. The sprocket gear 96 is connected to a drive shaft 98 journaled by the journal brackets 100 and 102 respectively secured to the connecting beams 28 and 34. The drive shaft 98 is driven by means of the pinion gear 104 in mesh with the gear 106. The gear 106 is secured to shaft 108 which is journaled between the journal brackets 110 and 112 respectively secured to the connecting beams 30 and 34. Connected to one end of the shaft 108 beyond the journal bracket 110, is a pinion gear 114 in mesh with gear 116 to which the ratchet wheel 118 is connected forming part of the ratchet drive assembly 82. The other end of the shaft 108 is connected to the ratchet wheel 120 associated with the ratchet drive assembly 58. The ratchet drive assembly 76 is also drivingly connected to the shaft 108 and toward this end, its ratchet wheel 122 is connected by shaft 124 to sprocket gear 126, the sprocket gear being drivingly connected by sprocket chain 128 to the sprocket gear 130 secured to the shaft 108. Spaced journal brackets 132 support the shaft 124 on the connecting beams 32 and 34. Motion in one direction is thereby transmitted to the power output wheel 84 by the drive gear train assembly 86 derived from the oscillatory movement of the float assemblies through associated one-way ratchet drive assemblies.

Referring now to FIGURES 1 and 4, it will be noted that the float assemblies 62 and 64 are supported by the fulcrum members in vertically spaced relation to each other the arrangement also being such that a single wave wall will successively displace the float assemblies 62 and 64 yet cause both float assemblies to impart motion to the associated one-way ratchet drives in the same direction. Adequate support for the float assemblies is therefore provided by means of the fulcrum members pivotally secured to the posts 38 at the opposite ends thereof by the pivot assembly 70. Each pivot assembly therefore includes a pivot bracket 134 secured by bolt assemblies 136 to the fulcrum member and receiving a pivot bolt 138 which extends through posts 38. The float assemblies are rigidly secured to the fulcrum members 68 and 66 in any suitable fashion. The float assembly 44 on the other hand is pivotally mounted intermediate its ends as aforementioned and has the pivot bracket 60 secured by bolt assemblies 138 to the lever member 48 as more clearly seen in FIGURE 2 so that the float assembly may be operatively connected to its associated one-way ratchet drive assembly 58 by means of a pair of connecting rods 142.

Referring now to FIGURES 2 and 3, a typical one-way ratchet drive assembly will be described in detail. The ratchet wheel 120 of the one-way ratchet drive assembly is associated with a pair of ratchet lever arms 144 and 146 pivotally connected to the upper ends of the connecting rods. The ratchet levers are loosely mounted on the shaft 108 to which the ratchet wheel is securely connected so that the ratchet levers may be oscillated through an arc of almost 180 degrees. The ratchet levers are also oscillated in opposite directions at the same time as shown by dotted lines in FIGURE 2 as the float assembly is oscillated. Accordingly, one or the other of the ratchet levers is operative to impart rotation to the ratchet wheel 120 during the upstroke and downstroke thereof. A pawl element 148 and 150 is therefore pivotally connected to each of the ratchet levers and biased into engagement with the ratchet teeth of the ratchet wheel by means of springs 152 and 154. Thus, as the lever member 48 of the float assembly moves upwardly, the upwardly moving ratchet lever 144 imparts clockwise rotation to the ratchet wheel through its pawl element 148 while the pawl element 150 of the ratchet lever 146 overruns the ratchet teeth. As the lever member of the float assembly moves downwardly, downward movement of the ratchet levers will continue to impart clockwise rotation to the ratchet wheel 120 since the pawl element 150 will then transmit drive from the ratchet lever 146 to the ratchet wheel as the pawl element 148 overruns. It will be further apparent, that at anytime drive may be imparted by one of the float assemblies to its associated ratchet drive assembly while the other ratchet drive assemblies will overrun.

From the foregoing description, the operation, construction and utility of the generator of the present invention will be apparent. The float assemblies regardless of the operative positions thereof, are arranged so that at least one of the ratchet drive assemblies will be in an operative position transmitting motion to the power output wheel. Accordingly, as will be apparent from FIGURES 6 through 8, the float assemblies cannot all be at an end of stroke position at the same time. Also, a single wave will cause successive displacement of the float assemblies in order to maintain continuous rotation of the power output wheel which may increase the output power. The ability of the ratchet drive assemblies to transmit in either direction of oscillatory movement of the float assemblies, avoids imposing any restraint on the float assemblies so as to extract the maximum amount of kinetic energy from the wave motion. Further, the arrangement is such as to permit the frame to absorb any lateral thrust without imposing any braking on the useful movement of the float assemblies.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A wave generator comprising, a frame, a plurality of spaced fulcrums mounted by the frame, a plurality of lever elements pivotally mounted by the respective fulcrums for movement about parallel spaced axes, float members secured to said lever elements at ends remote from the frame, said float members being spaced from each other in the direction of said lever elements and transverse thereto, one-way drive means mounted by said frame, connecting means operatively connecting each of said lever elements to the one-way drive means for transmitting power thereto in both directions of movement, the connecting means connected to at least one of the lever elements being on the same side of the fulcrum associated therewith as the associated float member while at least another of said lever elements having the associated connecting means connected thereto on the side of the fulcrum opposite the float member associated therewith.

2. The combination of claim 1 wherein said one-way drive means comprises, a plurality of ratchet wheels rotatably mounted by the frame, means drivingly interconnecting the ratchet wheels, a pair of ratchet levers rotatably mounted adjacent each ratchet wheel for oscillation in opposite directions and pawl elements mounted on each of said pair of ratchet levers for driving engagement with the ratchet wheels, said connecting means including pairs of connecting rods pivotally mounted on each of the lever elements and connected to said pairs of ratchet levers associated with the respective ratchet wheels.

3. A wave generator for converting the kinetic energy of a fluid medium into useful energy comprising, a frame fixedly mounted partially submerged in said fluid medium, a plurality of float assemblies movably mounted by the frame about spaced axes for successive displacement by a wave of the fluid medium, a one-way drive device operatively connected to each of said float assemblies including, a ratchet wheel rotatably mounted by the frame in spaced relation to the float assemblies, a pair of ratchet arms pivotally mounted by the ratchet wheel, spring biased pawls mounted on the ratchet arms for engagement with the ratchet wheel and a pair of connecting rods interconnected between said ratchet arms and the float assembly, and output drive means connected to all of the ratchet wheels, said frame including a pair of vertical posts, fulcrum means mounted by one of said posts and supporting said float assemblies about said spaced axes, each of said float assemblies including end portions remote from the frame, float members connected to the remote end portions, one of said float assemblies being connected to the connecting rods on a side of the one post opposite the float member, another of the float assemblies being connected to the connecting rods on the same side of the fulcrum means as the float member, said other float assembly extending beyond the other post and at least a third float assembly pivotally mounted by said other post.

References Cited by the Examiner

UNITED STATES PATENTS

| | | | |
|---|---|---|---|
| 643,557 | 2/1900 | Swearingen | 253—11 |
| 1,295,170 | 2/1919 | Hudgins | 230—66 |
| 1,303,897 | 5/1919 | Heckerman. | |
| 1,443,626 | 1/1923 | Hinckley | 253—5 |
| 1,540,364 | 6/1925 | Roldan | 253—11 |
| 1,667,152 | 4/1928 | Heggs | 253—11 X |
| 1,688,032 | 10/1928 | Blair | 253—11 |

FOREIGN PATENTS

| | | |
|---|---|---|
| 562,217 | 8/1958 | Canada. |
| 104,157 | 1/1918 | Great Britain. |
| 250,209 | 11/1926 | Great Britain. |
| 359,414 | 5/1938 | Italy. |

EDGAR W. GEOGHEGAN, *Primary Examiner.*

SAMUEL LEVINE, *Examiner.*

E. A. POWELL, *Assistant Examiner.*